(12) United States Patent
Kim et al.

(10) Patent No.: US 7,764,931 B2
(45) Date of Patent: Jul. 27, 2010

(54) METHOD AND APPARATUS FOR TRANSMITTING/RECEIVING FEEDBACK INFORMATION REPRESENTING CHANNEL QUALITY IN A MIMO-OFDM SYSTEM

(75) Inventors: Sung-Jin Kim, Suwon-si (KR); Ho-Jin Kim, Seoul (KR); Jianjun Li, Suwon-si (KR); Jung-Hoon Suh, Yongin-si (KR); Chang-Soon Park, Chungju-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 532 days.

(21) Appl. No.: 11/840,918

(22) Filed: Aug. 17, 2007

(65) Prior Publication Data

US 2008/0043677 A1 Feb. 21, 2008

(30) Foreign Application Priority Data

Aug. 18, 2006 (KR) ...................... 10-2006-0078339

(51) Int. Cl.
*H04B 1/00* (2006.01)
*H04B 7/00* (2006.01)

(52) U.S. Cl. .................. 455/69; 455/68; 455/67.11; 455/67.13; 370/343; 370/329; 370/295; 370/347

(58) Field of Classification Search ............... 455/67.11, 455/67.13, 67.16, 68, 69, 70, 71, 522; 370/343, 370/329, 295, 347, 208, 478; 375/144, 260, 375/267, 295, 296, 298, 299, 347
See application file for complete search history.

(56) References Cited

U.S. PATENT DOCUMENTS 6,917,821 B2 * 7/2005 Kadous et al. ........... 455/562.1

7,065,144 B2 * 6/2006 Walton et al. ............... 375/260
7,466,749 B2 * 12/2008 Medvedev et al. .......... 375/227

(Continued)

FOREIGN PATENT DOCUMENTS

EP 1575234 9/2005

(Continued)

OTHER PUBLICATIONS

J. Choi et al., "Interpolation Based Unitary Precoding for Spatial Multiplexing MIMO-OFDM with Limited Feedback", Proceedings of the IEEE Global Telecommunications Conference, vol. 1, Nov. 29, 2004, pp. 214-218.

(Continued)

*Primary Examiner*—Tuan A Tran
(74) *Attorney, Agent, or Firm*—NSIP Law (57) ABSTRACT

A method of transmitting/receiving feedback information representing channel quality in a MIMO-OFDM system, in which a receiver measures channel qualities of signals transmitted on a plurality of subbands through a plurality of transmitting antennas by a transmitter, selects a predetermined number of subbands having a highest transmission performance based on the measured channel qualities and preceding information, determines at least one subband group with a maximum rate from among the selected subbands and the preceding information associated with the at least one subband group, and transmits feedback information to the transmitter, the feedback information including channel quality information about the at least one subband group and the associated preceding information.

33 Claims, 7 Drawing Sheets

U.S. PATENT DOCUMENTS

| | | | |
|---|---|---|---|
| 7,486,655 B2 * | 2/2009 | Ting et al. | 370/343 |
| 7,508,748 B2 * | 3/2009 | Kadous | 370/208 |
| 7,613,248 B2 * | 11/2009 | Ketchum et al. | 375/296 |
| 7,668,125 B2 * | 2/2010 | Kadous | 370/310 |
| 2006/0056451 A1 | 3/2006 | Yano et al. | |

FOREIGN PATENT DOCUMENTS

| | | | |
|---|---|---|---|
| WO | WO 02/082689 A2 | 10/2002 | |
| WO | WO 03/058871 A1 | 7/2003 | |
| WO | WO 2007/115236 | 11/2007 | |

OTHER PUBLICATIONS

Office Action issued in corresponding European Patent Application No. 07016290.4 dated Aug. 14, 2008.

* cited by examiner

| $U_1$ | | $U_2$ | |
|---|---|---|---|
| $U_{11}$ | $U_{12}$ | $U_{21}$ | $U_{22}$ |
| CQI_SB5 | CQI_SB3 | CQI_SB9 | CQI_SB1 |
| CQI_SB2 | CQI_SB4 | CQI_SB7 | CQI_SB5 |
| CQI_SB6 | CQI_SB8 | CQI_SB2 | CQI_SB4 |
| CQI_SB1 | CQI_SB7 | CQI_SB6 | CQI_SB3 |

→ $U_{11}$ : CQI_SB5, CQI_SB2

| $U_1$ | | $U_2$ | |
|---|---|---|---|
| $U_{11}$ | $U_{12}$ | $U_{21}$ | $U_{22}$ |
| CQI_SB6 | CQI_SB3 | CQI_SB9 | CQI_SB1 |
| CQI_SB1 | CQI_SB4 | CQI_SB7 | CQI_SB4 |
|  | CQI_SB8 | CQI_SB6 | CQI_SB3 |
|  | CQI_SB7 |  |  |

→ $U_{11}$: CQI_SB5, CQI_SB2; $U_{21}$: CQI_SB9, CQI_SB7

FIG.8

METHOD AND APPARATUS FOR TRANSMITTING/RECEIVING FEEDBACK INFORMATION REPRESENTING CHANNEL QUALITY IN A MIMO-OFDM SYSTEM

CROSS-REFERENCE TO RELATED APPLICATIONS

This application claims the benefit of Korean Application No. 2006-78339, filed Aug. 18, 2006, in the Korean Intellectual Property Office, the disclosure of which is incorporated herein by reference.

BACKGROUND OF THE INVENTION

1. Field of the Invention

An aspect of the present invention generally relates to a mobile communication system. More particularly, an aspect of the present invention relates to a method and apparatus for transmitting/receiving channel quality information in a Multiple Input Multiple Output (MIMO)-Orthogonal Frequency Division Multiplexing (OFDM) mobile communication system.

2. Description of the Related Art

MIMO is essential to enable high-speed mobile data services in a broadband mobile communication system. A MIMO system is an antenna system with multiple inputs and multiple outputs. Since the MIMO system can transmit different information from each antenna, the MIMO system can increase the amount and reliability of processed information. In contrast, $2^{nd}$ Generation (2G) and $3^{rd}$ Generation (3G) mobile communication systems have limitations in fast processing of a wide range of data due to the use of a single transmit/receive antenna.

Along with MIMO, OFDM has emerged as a promising post-3G mobile communication technology. In OFDM, time and frequency resources are divided for allocation to users. OFDM is favorable to broadband transmission and allocates time and frequency resources according to users' demands. Due to these benefits, OFDM was adopted for Digital Audio Broadcasting (DAB) and Digital Video Broadcasting (DVB) in Europe, and also approved as a standard for Wireless Local Area Network (WLAN). Compared to OFDM, Code Division Multiple Access (CDMA) supports no more than up to 144 kbps in a mobile environment and is not effective in processing a large amount of wireless data.

The current wireless communication systems attempt to achieve high-quality transmission of data and large multimedia data transmission with limited frequency resources. Therefore, techniques for transmitting a large amount of data with limited frequency resources have been proposed. A major technique is the MIMO system that can transmit more data without using more frequency resources.

However, the MIMO system is vulnerable to Inter-Symbol Interference (ISI) and frequency selective fading involved in high-speed data transmission. To overcome this shortcoming, MIMO is used in combination with OFDM. An OFDM system divides high-rate data streams into low-rate data streams by parallel data processing and transmits the low-rate data streams on a plurality of subcarriers simultaneously. The use of low-rate parallel subcarriers increases a symbol period, thereby decreasing ISI. Since guard intervals are used, the ISI is almost perfectly cancelled.

As the OFDM system uses multiple subcarriers, it is robust against frequency selective fading. Therefore, the combination of MIMO and OFDM compensates for the shortcomings of MIMO, while realizing the advantages of MIMO. The MIMO system typically has a plurality of transmitter antennas and a plurality of receiver antennas. A system using MIMO and OFDM in combination is called a MIMO-OFDM system.

In the MIMO system, a transmitter selects at least one appropriate transmitter antenna for a Mobile Station (MS) with one or more receiver antennas. To do so, the transmitter, for example, a Base Station (BS) needs feedback of channel quality information from the MS. In the nature of using a plurality of transmit/receive antennas, the total amount of channel quality information is very large, thus imposing a large overhead on uplink signaling. Especially in the MIMO-OFDM system, the feedback information further includes channel quality information about a plurality of individual subcarriers (i.e. subbands), adding to the uplink signaling overhead. Accordingly, many techniques are under development to reduce the amount of feedback information, while enabling the transmitter to efficiently map data streams to the transmitter antennas.

The simplest method for transmitting feedback information in the MIMO-OFDM system is to transmit channel quality information about all subbands or N best subbands, which results in a very large signaling overhead. Another method is to select a few subbands and schedule the selected subbands only. However, this method gives up an advantage of OFDM (i.e. frequency selection diversity). A third method is to generate channel quality information on a subband group basis, each subband grouping having M adjacent subbands. Considering a grouping size dominantly affects signaling efficiency, an optimal grouping size should be adapted according to channel status. Moreover, the third method suffers resource use inefficiency when the channel statuses of adjacent subbands are different.

SUMMARY OF THE INVENTION

An aspect of the present invention is to address at least the problems and/or disadvantages and to provide at least the advantages described below. Accordingly, an aspect of the present invention is to provide a method and apparatus for efficiently feeding back channel quality information in a MIMO-OFDM mobile communication system.

Another aspect of the present invention is to provide a method and apparatus for reducing the amount of feedback information by which channel qualities are reported in a MIMO-OFDM system.

In accordance with an aspect of the present invention, there is provided a method for receiving feedback information representing channel quality in a receiver in a MIMO-OFDM system, in which the receiver measures channel qualities of signals transmitted on a plurality of subbands through a plurality of transmitter antennas by a transmitter, selects a predetermined number of subbands with a best transmission performance for each piece of preceding information based on the measured channel qualities, determines at least one subband group with a maximum rate from among the selected subbands and preceding information associated with the at least one subband group, and transmits feedback information to the transmitter, the feedback information including channel quality information about the at least one subband group and the associated preceding information.

In accordance with another aspect of the present invention, there is provided an apparatus for transmitting feedback information representing channel quality in a receiver in a MIMO-OFDM system, in which a channel quality measurer measures channel qualities of signals transmitted on a plurality of subbands through a plurality of transmitter antennas by a transmitter, and a feedback information generator selects a predetermined number of subbands with a best transmission performance for each piece of preceding information based on the channel quality measurements, determines at least one subband group with a maximum rate from among the selected subbands and preceding information associated with the at least one subband group, and transmits feedback information to the transmitter, the feedback information including channel quality information about the at least one subband group and the associated preceding information.

In accordance with a further aspect of the present invention, there is provided a method for receiving feedback information representing channel quality from at least one receiver in a transmitter in a MIMO-OFDM system, in which the transmitter receives feedback information from the at least one receiver, the feedback information including channel quality information about at least one subband group and an associated preceding information, and determines a transmission parameter for subband allocation and preceding according to the feedback information in order to transmit a transmission signal. Here, the at least one subband group is selected from among a predetermined number of subbands with a best transmission performance for each piece of preceding information based on channel qualities measured in the at least one receiver.

In accordance with still another aspect of the present invention, there is provided an apparatus for receiving feedback information representing channel quality from at least one receiver in a transmitter in a MIMO-OFDM system, in which a feedback information receiver receives feedback information from the at least one receiver, the feedback information including channel quality information about at least one subband group and an associated preceding information, and a scheduler determines a transmission parameter for subband allocation and precoding according to the feedback information in order to transmit a transmission signal. Here, the at least one subband group is selected from among a predetermined number of subbands with a best transmission performance for each preceding information based on channel qualities measured in the at least one receiver.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Exemplary embodiments of the present invention provide a method for transmitting feedback information (i.e. channel quality information) representing downlink channel quality, especially a method for reducing the size of the feedback information in a MIMO-OFDM system.

In an OFDM system, a total frequency band is divided into a plurality of subbands and the subbands are allocated to individual MSs. Feedback information transmitted from the plurality of MSs to a BS causes a large overhead. Therefore, one task to tackle in the MIMO-OFDM system is to reduce the size of the feedback information.

An aspect of the present invention makes an approach regarding reduction of feedback information as follows, although the following exemplary embodiment does not limit the spirit and scope of the present invention.

1) Subbands are grouped based on feedback information in terms of overhead reduction (successive subbands are simply not grouped into one group).

2) CQIs are determined jointly in frequency and space domains.

3) Multi-user diversity can be supported (but, not limited to multiple users).

Figure 1:
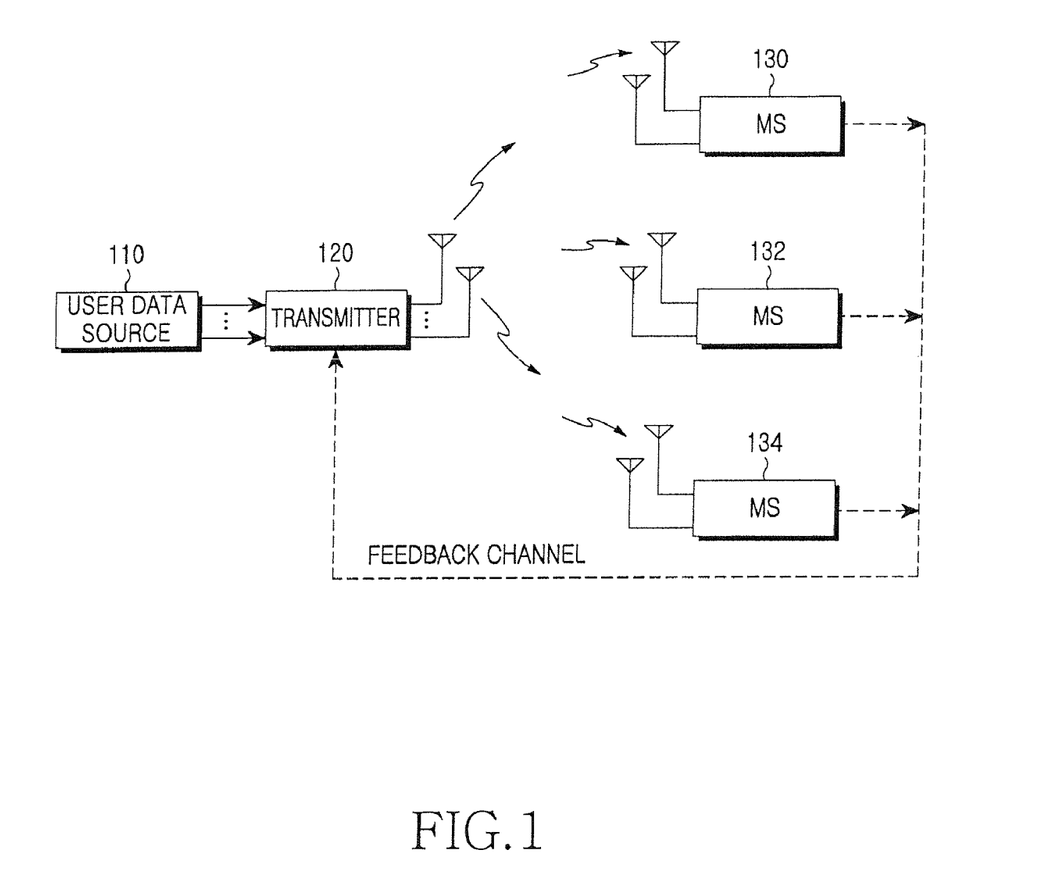
FIG. 1 illustrates a system model according to an exemplary embodiment of the present invention.

FIG. 1 illustrates a system model according to an exemplary embodiment of the present invention. Referring to FIG. 1, a transmitter 120 can be a BS in a cellular system or an Access Point (AP) in a WLAN system. The transmitter 120 receives data streams for at least one MS, herein a plurality of MSs 130, 132 and 134 from a user data source 110. The transmitter 120 transmits a reference signal by which to measure channel quality, i.e., a pilot signal to the MSs 130, 132 and 134. Then the MSs 130, 132 and 134 measure downlink channel qualities using the pilot signal, generate feedback information representing the channel quality measurements, and transmit the feedback information on predetermined channels, i.e., feedback channels to the transmitter 120.

The transmitter 120 selects the MSs 130, 132 and 134 to receive data streams in a current transmission period, and the transmitter antennas through which the data streams are to be transmitted to the MSs 130, 132 and 134, transmit power for the data streams and Modulation and Coding Scheme (MCS) levels for the data streams, according to the feedback information. The data streams are transmitted to the selected MSs 130, 132 and 134 using the MCS levels and the transmit power through the selected transmitter antennas.

Prior to the transmission, the data streams may be precoded so that the signals transmitted through the transmitter antennas are mutually orthogonal. The preceding is a technique for increasing transmission diversity efficiency by multiplying encoded and modulated signals by a predetermined preceding matrix so that they are orthogonal. The preceding matrix is composed of complex weights to be multiplied by input signals. It is a unitary or non-unitary matrix, which can be selected according to feedback information received from each MS.

For process simplification, the MSs 130, 132 and 134 preserve a codebook with a set of available preceding matrices and transmit to the transmitter 120 the feedback information including information which indicates an appropriate preceding matrix for a measured channel quality. Similarly, the transmitter 120 has the same codebook and multiplies precoding matrices indicated by the feedback information from the MSs 130, 132 and 134 by signals directed to the MSs 130, 132 and 134, prior to transmission through the transmitter antennas. In the case where preceding matrices are used, combinations of data streams and transmitter antennas are called virtual antennas.

In accordance with an exemplary embodiment of the present invention, feedback information from an MS includes preceding information indicating at least one preceding matrix selected by the MS and the CQI of a selected subband group that maximizes transmission performance for the selected preceding matrix. Conventionally, subbands are grouped such that each group includes successive subbands. In contrast, subbands are optimally grouped according to a selected preceding matrix and channel quality measurements. The transmitter selects a preceding matrix that maximizes transmission performance according to the feedback information from the MS and determines other transmission parameters (e.g. transmit power, MCS level, etc.) based on associated channel qualities. If the transmitter receives feedback information from a plurality of MSs, it selects a preceding matrix that maximizes a sum rate based on the feedback information.

Figure 2:
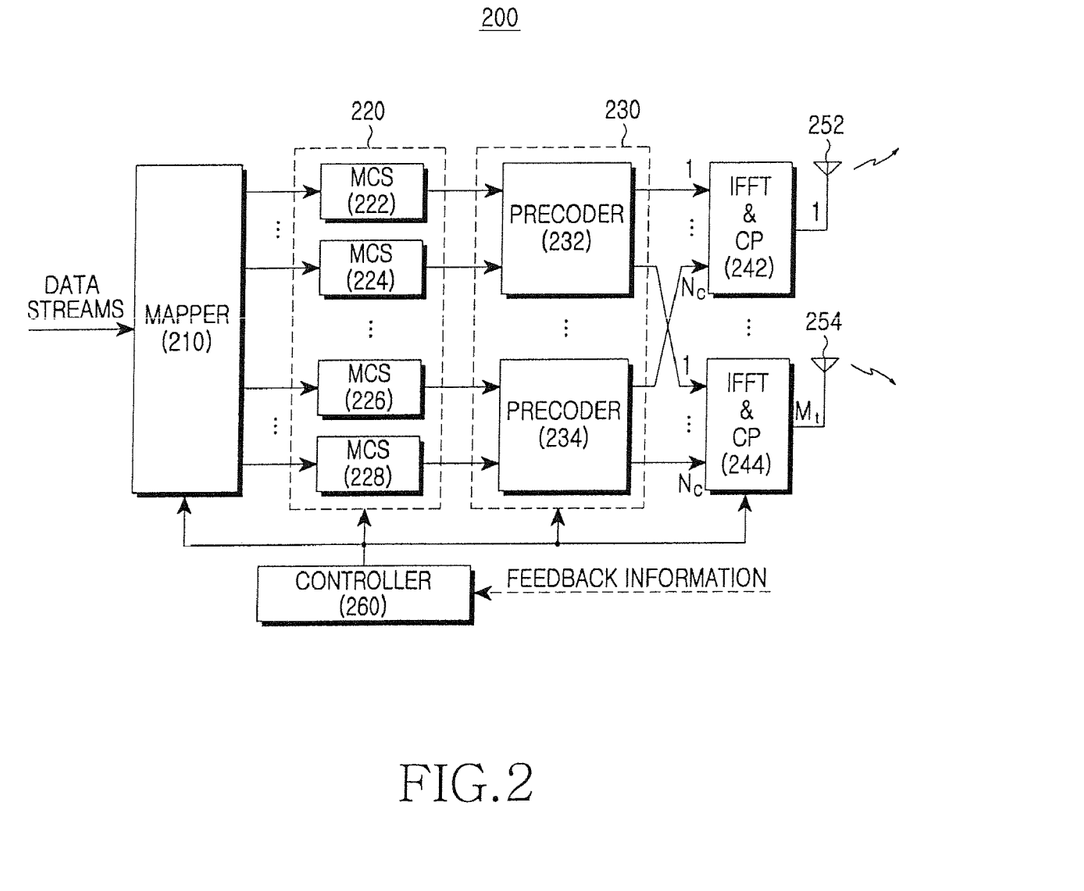
FIG. 2 is a detailed block diagram of a transmitter in a MIMO-OFDM system according to an exemplary embodiment of the present invention.

FIG. 2 is a detailed block diagram of a transmitter in a MIMO-OFDM system according to an exemplary embodiment of the present invention. Referring to FIG. 2, a transmitter 200 includes a mapper 210, an encoder and modulator 220, a precoder unit 230, OFDM modulators 242 to 244, and $M_t$ transmitter antennas 252 to 254. While the following description is made in the context of transmitting data streams to a plurality of MSs through a plurality of transmitter antennas, it is clearly to be understood that one MS and one transmitter antenna can be selected in real transmission.

The mapper 210 receives one or more data streams to be transmitted to the MSs, i.e., users and also receives scheduling information from the users from a controller 260. The controller 260 has a feedback information receiver (not shown) for receiving feedback information with the Channel Quality Indications (CQIs) of grouped subbands and preceding information representing preceding matrices for which the CQIs are measured from at least one MS, and a scheduler (not shown) for, based on the feedback information, selecting at least one MS that maximizes transmission efficiency and determining transmission parameters including data streams, subbands, an MCS level, a preceding matrix, and a transmitter antenna to be used for the at least one MS. Here, the CQI can be a Carrier-to-Interference (C/I) ratio.

The mapper 210 extracts data streams to be transmitted from among the received data streams under the control of the controller 260. The encoder and modulator 220 include a plurality of MCS blocks 222 to 228. Each MCS block receives one data stream from the mapper 210 and encodes and modulates the data stream at an MCS level decided by the controller 260.

The precoder unit 230 has, for example, K precoders 232 to 234, each receiving up to $M_t$ signals for preceding. The precoders 232 to 234 receive the coded and modulated signals from the MCS blocks 222 to 228, multiply the received signals by precoding matrices decided by the controller 260, and provide the resulting precoded signals to OFDM modulators 242 to 244 mapped to the respective transmitter antennas 252 to 254.

The OFDM modulators 242 to 244 each have an Inverse Fast Fourier Transform (IFFT) processor and a Cyclic Prefix (CP) adder. Each IFFT processor converts Nc received signals to time signals each including $N_c$ subband components. Each CP adder adds a CP to the time signals and serializes the CP-added time signals. The serial time signals from the OFDM modulators 242 to 244 are transmitted through the transmitter antennas 252 to 254 mapped to the OFDM modulators 242 to 244.

Figure 3:
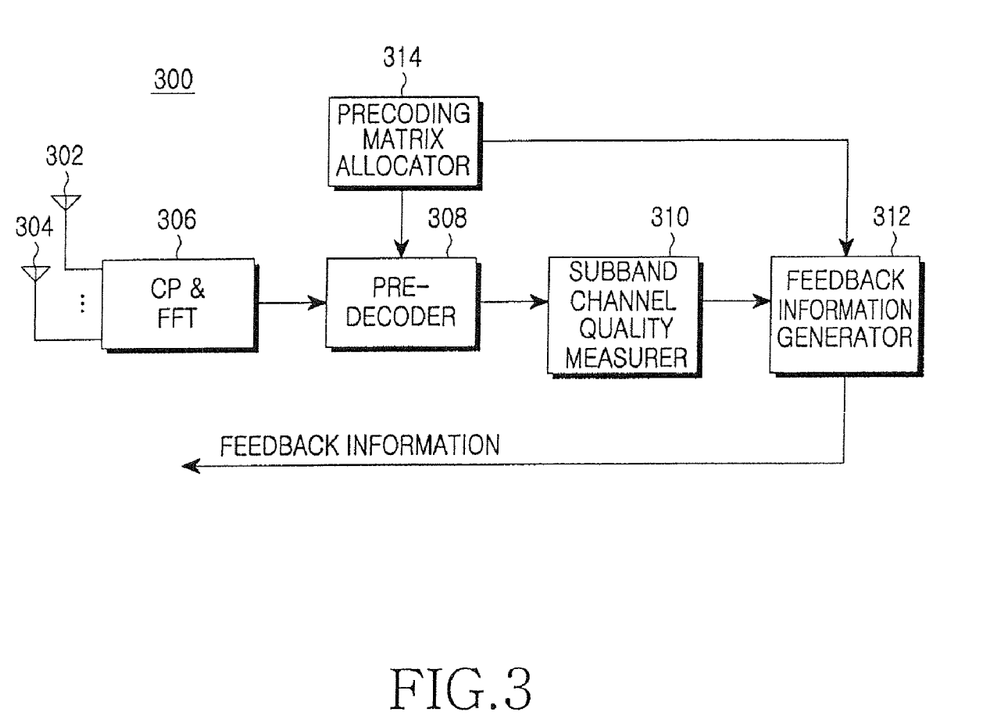
FIG. 3 is a block diagram of an MS for transmitting feedback information according to an exemplary embodiment of the present invention.

FIG. 3 is a block diagram of an MS for transmitting feedback information according to an exemplary embodiment of the present invention. Referring to FIG. 3, a receiver 300 includes at least one receiver antenna, herein a plurality of receiver antennas 302 to 304, an OFDM demodulator 306, a pre-decoder 308, a precoding matrix allocator 314, a subband channel quality measurer 310, and a feedback information generator 312. Components related to data reception are not shown in FIG. 3.

The OFDM demodulator 306 removes CPs from OFDM signals received from the receiver antennas 302 to 304, processes the CP-removed OFDM signals by Fast Fourier Transform (FFT), and provides FFT signals to the pre-decoder 308.

The pre-decoder 308 multiplies the FFT signals by a preceding matrix received from the preceding matrix allocator 314. The preceding matrix allocator 314 provides the preceding matrices of a codebook preset between the MS and the transmitter, one by one to the pre-decoder 308.

The subband channel quality measurer 310 detects a pilot signal from a pre-decoded signal received from the pre-decoder 308 and measures the CQIs of the respective subbands of the pilot signal. The feedback information generator 312 collects the CQIs of the subbands for all preceding matrices, creates channel quality lists each having the CQIs of the subbands in a descending order for each preceding matrix, and generates feedback information representing the CQIs of a predetermined number of subbands that maximize transmission efficiency and their associated preceding matrices. The feedback information is transmitted on a feedback channel to the transmitter. The feedback information generation will be described in more detail with reference to FIG. 4.

Figure 4:
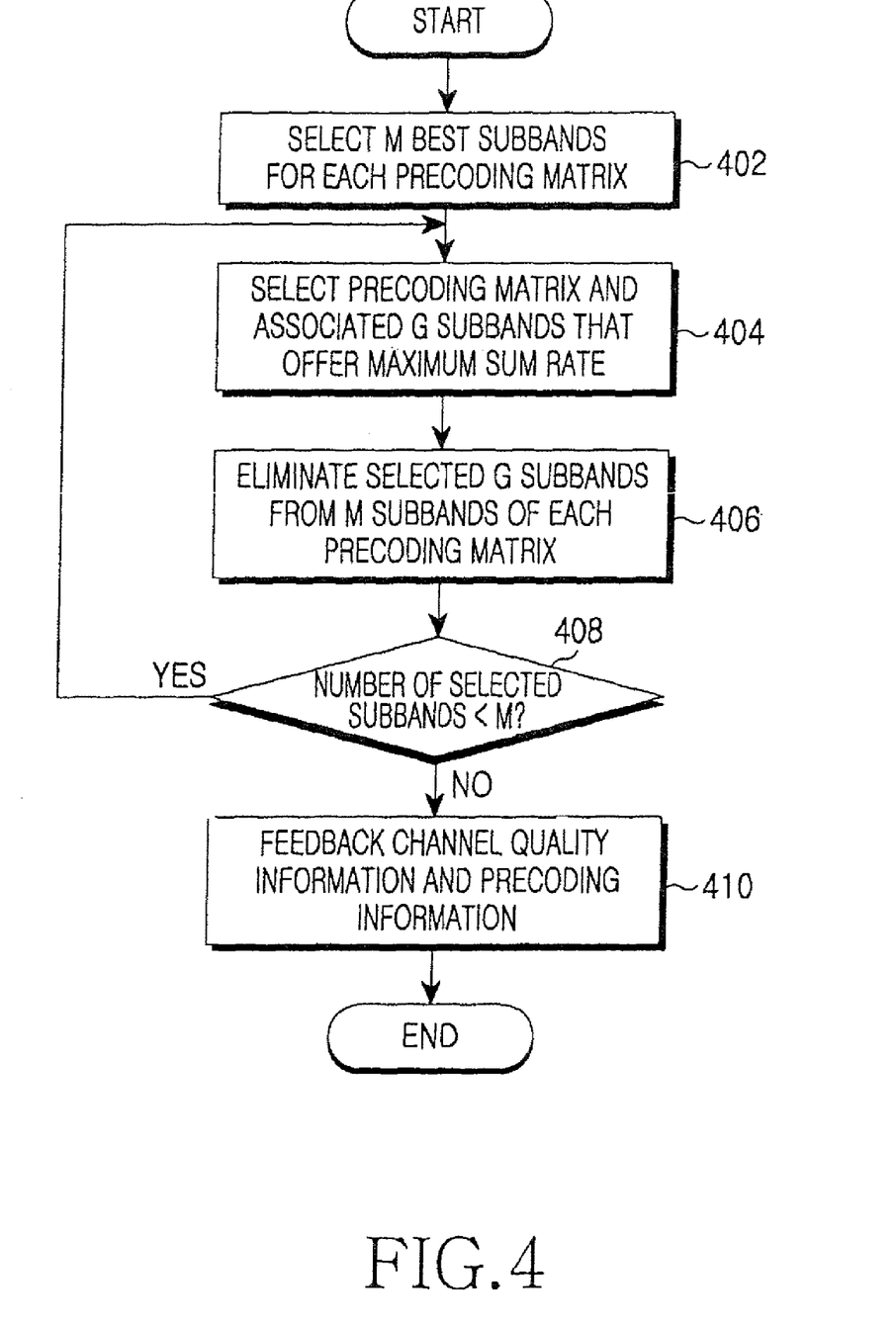
FIG. 4 is a flowchart illustrating an operation for generating feedback information according to an exemplary embodiment of the present invention.

FIG. 4 is a flowchart illustrating an operation for generating feedback information according to an exemplary embodiment of the present invention. The operations illustrated in FIG. 4 can take place in the feedback information generator 312 of each MS. Before describing FIG. 4, variables used herein are defined as follows. The variables are all positive integers.

N: the number of available subbands.

M: the number of best subbands that each MS selects to generate feedback information.

G: the number of grouped subbands, also called the size of the subband group. It is preferably a factor of M or a positive integer less than or equal to M.

L: the number of subband groups associated with feedback information. It is equal to M/G.

K: the total number of preceding matrices stored in the transmitter and the receiver, for use in mapping data streams. It is also called a codebook size.

Referring to FIG. 4, the MS selects M best subbands for each preceding matrix included in a preset codebook based on the CQIs of signals that the transmitter has transmitted on N subbands in operation 402. M best subbands for a preceding matrix are defined as M subbands with the highest CQIs when the preceding matrix is applied. For a $k^{th}$ preceding matrix, the CQIs of M selected subbands are expressed as Ek={CQI_SBk, 1, CQI_SBk, 2, ..., CQI_SBk, M}(k=1, 2, ... K)

In operation 404, the MS selects a preceding matrix and G subbands associated with the preceding matrix, which maximize transmission efficiency in terms of sum rate. The G subbands form a subband group associated with the selected preceding matrix. That is, the MS calculates the sum of the rates of a data stream on G subbands for each preceding matrix and selects a preceding matrix with the highest sum rate and the G subbands of the selected preceding matrix.

In operation 406, the MS eliminates the selected G subbands from the M subbands of each precoding matrix in order to prevent redundant inclusion of the selected G subbands in feedback information.

In operation 408, the MS compares the number of subbands selected so far with the number M of subbands transmittable in feedback information. In other words, the MS compares the number of subband groups with L. If the number of the selected subbands is less than M, the MS returns to operation 404. If the number of the selected subbands reaches M, the MS generates feedback information including channel quality information and preceding information associated with the channel quality information, and transmits the feedback information to the transmitter in operation 410. The channel quality information represents the CQIs of the selected M subbands and the preceding information includes the indexes of preceding matrices associated with the M subbands.

Figure 5:
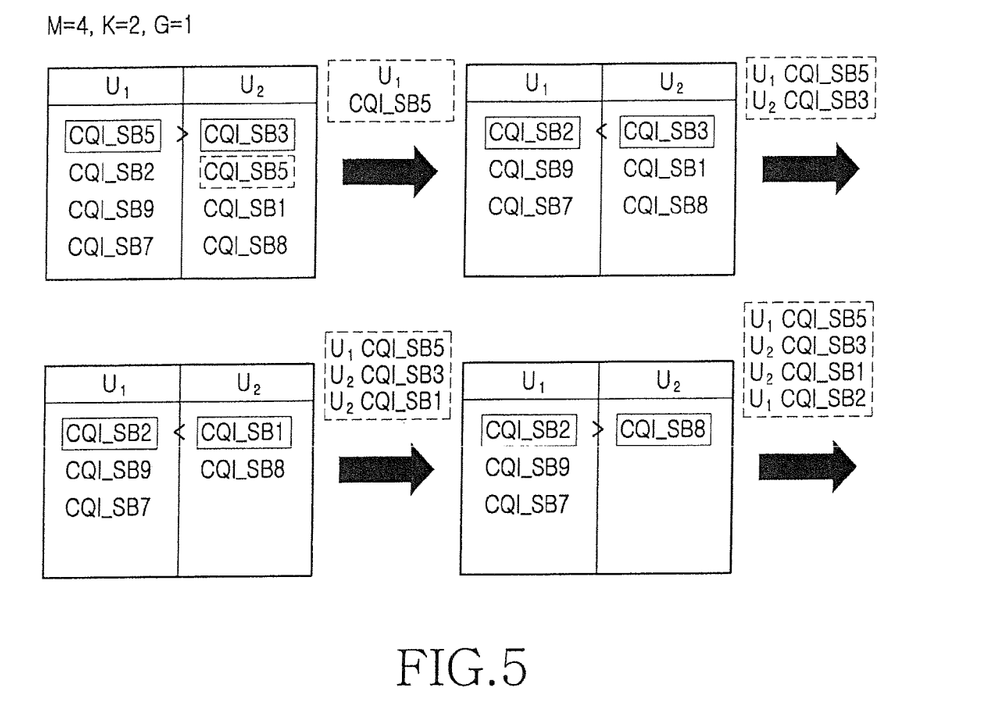
FIGS. 5 to 8 illustrate subband grouping according to exemplary embodiments of the present invention.

FIG. 5 illustrates subband grouping when M=4, K=2 and G=1 according to an exemplary embodiment of the present invention. Referring to FIG. 5, the MS measures the CQIs of total subbands for each of first and second precoding matrices $U_1$ and $U_2$ included in a codebook with K=2 and makes channel quality lists for $U_1$ and $U_2$ by arranging the CQIs in a descending order. The channel quality lists include the CQIs of the subbands that can be achieved when the transmitter applies $U_1$ and $U_2$. That is, the CQIs of the subbands are values measured after applying $U_1$ and $U_2$ to a received OFDM signal.

For $U_1$, four CQIs (M=4) that maximize transmission efficiency are CQI_SB5, CQI_SB2, CQI_SB9 and CQI_SB7. For $U_2$, four CQIs that maximize transmission efficiency are CQI_SB3, CQI_SB5, CQI_SB1 and CQI_SB8. A specific algorithm for determining the best CQIs for each precoding matrix is beyond the scope of the present invention and thus will not be described herein in detail.

Because G=1, the best CQI for $U_1$, CQI_SB5 is compared with the best CQI for $U_2$, CQI_SB3. If CQI_SB5 is larger than CQI_SB3, the MS selects CQI_SB5 for $U_1$ as feedback information. Then the MS eliminates the selected CQI_SB5 from the channel quality lists of $U_1$ and $U_2$.

The next best CQI in the channel quality list of $U_1$, CQI_SB2 is compared with CQI_SB3 in the channel quality list of $U_2$. If CQI_SB2 is less than CQI_SB3, the MS selects CQI_SB3 for $U_2$ as feedback information. Then, since CQI_SB1 for $U_2$ is larger than CQI_SB2 for $U_1$, CQI_SB1 for $U_2$ is selected as feedback information. Finally, since CQI_SB2 for $U_1$ is larger than CQI_SB8 for $U_2$, CQI_SB2 is selected as feedback information.

Since four subbands (M=4) included in feedback information are selected, the CQIs of the four subbands SB5, SB3, SB1 and SB2 and the preceding matrices associated with the four subbands are set in the feedback information, as illustrated in Table 1 below.

TABLE 1

| Precoding information | Channel quality information |
|---|---|
| $U_1$ | CQI_SB5 |
| $U_2$ | CQI_SB3 |
| $U_2$ | CQI_SB1 |
| $U_1$ | CQI_SB2 |

As noted from Table 1, the CQIs are sorted in a descending order in the feedback information.

Figure 6:
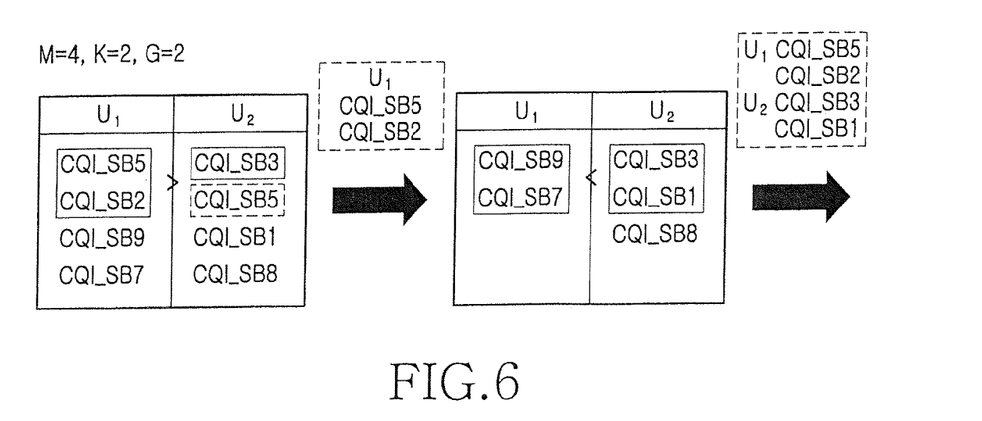

FIG. 6 illustrates subband grouping when M=4, K=2 and G=2 according to an exemplary embodiment of the present invention. Referring to FIG. 6, the MS measures the CQIs of total subbands for each of first and second precoding matrices $U_1$ and $U_2$ included in a codebook with K=2 and makes channel quality lists for $U_1$ and $U_2$ by arranging the CQIs in a descending order.

For $U_1$, four CQIs (M=4) that maximize transmission efficiency are CQI_SB5, CQI_SB2, CQI_SB9 and CQI_SB7. For $U_2$, four CQIs that maximize transmission efficiency are CQI_SB3, CQI_SB5, CQI_SB1 and CQI_SB8.

Because G=2, the sum of the two best CQIs for $U_1$, CQI_SB5 and CQI_SB2 is compared with that of the two best CQIs for $U_2$, CQI_SB3 and CQI_SB5. If the sum of CQI_SB5 and CQI_SB2 is larger than that of CQI_SB3 and CQI_SB5, the MS selects CQI_SB5 and CQI_SB2 from $U_1$ as feedback information. Then the MS eliminates the selected CQI_SB5 and CQI_SB2 from the channel quality lists of $U_1$ and $U_2$.

The sum of the next two best CQIs, CQI_SB9 and CQI_SB7 in the channel quality list of $U_1$ is compared with that of the two best CQIs, CQI_SB3 and CQI_SB1 in the channel quality list of $U_2$. If the sum of CQI_SB9 and CQI_SB7 is less than the sum of CQI_SB3 and CQI_SB1, the MS selects CQI_SB3 and CQI_SB1 from $U_2$ as feedback information.

Since four subbands (M=4) included in feedback information are all selected, the CQIs of two subband groups (L=M/G=2), [SB5, SB2] and [SB3, SB1] and the precoding matrices corresponding to the two subband groups are set in the feedback information, as illustrated in Table 2 below.

TABLE 2

| Precoding information | Channel quality information |
|---|---|
| $U_1$ | CQI_SB5, CQI_SB2 |
| $U_2$ | CQI_SB3, CQI_SB1 |

Figure 7:
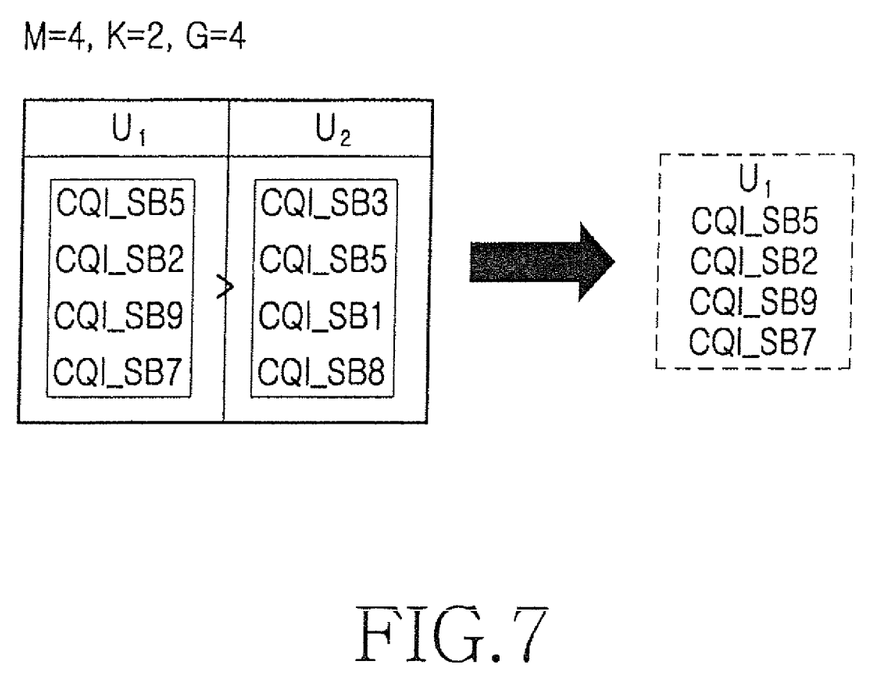

FIG. 7 illustrates subband grouping when M=4, K=2 and G=4 according to an exemplary embodiment of the present invention. Referring to FIG. 7, the MS measures the CQIs of total subbands for each of first and second precoding matrices $U_1$ and $U_2$ included in a codebook with K=2 and makes channel quality lists for $U_1$ and $U_2$ by arranging the CQIs in a descending order.

For $U_1$, four CQIs (M=4) that maximize transmission efficiency are CQI_SB5, CQI_SB2, CQI_SB9 and CQI_SB7. For $U_2$, four CQIs that maximize transmission efficiency are CQI_SB3, CQI_SB5, CQI_SB1 and CQI_SB8.

Because G=4, the sum of the four CQIs for $U_1$, CQI_SB5, CQI_SB2, CQI_SB9 and CQI_SB7 is compared with that of the four CQIs for $U_2$, CQI_SB3, CQI_SB5, CQI_SB1 and CQI_SB8. If the sum of CQI_SB5, CQI_SB2, CQI_SB9 and CQI_SB7 is larger than that of CQI_SB3, CQI_SB5, CQI_SB1 and CQI_SB8, the MS selects CQI_SB5, CQI_SB2, CQI_SB9 and CQI_SB7 for $U_1$ as feedback information.

Since four subbands (M=4) included in feedback information are all selected, the CQIs of one subband group (L=M/G=1), [SB5, SB2, SB9, SB7] and the precoding matrix corresponding to the one subband group are set in the feedback information, as illustrated in Table 3 below.

TABLE 3

| Precoding information | Channel quality information |
|---|---|
| $U_1$ | CQI_SB5, CQI_SB2, CQI_SB9, CQI_SB7 |

It can be further contemplated as another exemplary embodiment of the present invention that the CQIs of subbands measured on a column vector (precoding vector) basis rather than on a precoding matrix basis, each column vector of a precoding matrix corresponding to a transmitter antenna, can be included in feedback information. Therefore, an intended number (referred to as rank) of transmitter antennas can be allocated to each MS, instead of all transmitter antennas. Therefore, the MS groups subbands on a precoding vector basis to transmit feedback information. In this case, the operations of FIG. 4 are performed on a precoding vector basis.

Figure 8:
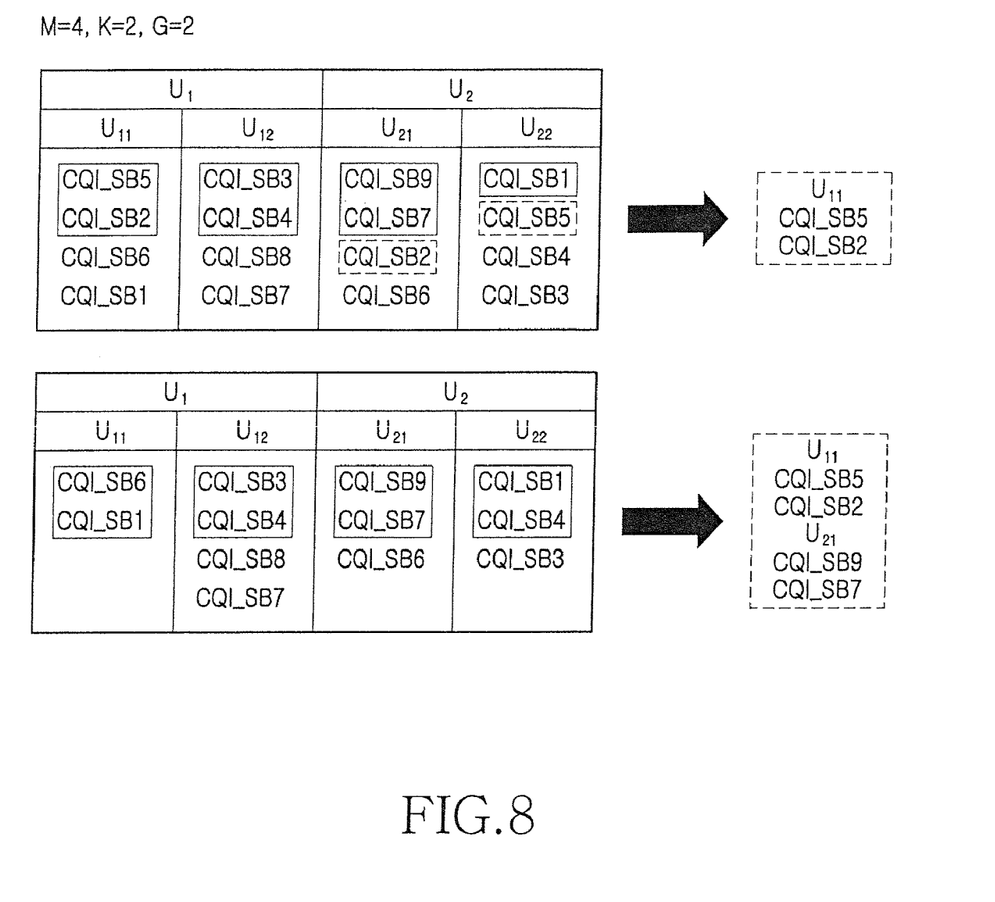

FIG. 8 illustrates subband grouping when M=4, K=2 and G=2 according to another exemplary embodiment of the present invention. As illustrated in FIG. 8, first and second precoding matrices $U_1$ and $U_2$ included in a codebook with K=2 are 2×2 matrices. Hence, there are two precoding vectors $U_{11}$ and $U_{12}$ for $U_1$ and two precoding vectors $U_{21}$ and $U_{22}$ for $U_2$.

Referring to FIG. 8, the MS measures the CQIs of total subbands for each of the precoding vectors $U_{11}$, $U_{12}$, $U_{21}$ and $U_{22}$ and makes channel quality lists for $U_{11}$, $U_{12}$, $U_{21}$ and $U_{22}$ by arranging the CQIs in a descending order.

For $U_1$, four CQIs (M=4) that maximize transmission efficiency are CQI_SB5, CQI_SB2, CQI_SB6 and CQI_SB1. For $U_{12}$, four CQIs that maximize transmission efficiency are CQI_SB3, CQI_SB4, CQI_SB8 and CQI_SB7. For $U_{21}$, four CQIs that maximize transmission efficiency are CQI_SB9, CQI_SB7, CQI_SB2 and CQI_SB6. For $U_{22}$, four CQIs that maximize transmission efficiency are CQI_SB1, CQI_SB5, CQI_SB4 and CQI_SB3.

Because G=2, the sum of the two best CQIs, CQI_SB5 and CQI_SB2 for $U_{11}$, the sum of the two best CQIs, CQI_SB3 and CQI_SB5 for $U_{12}$, the sum of the two best CQIs, CQI_SB9 and CQI_SB7 for $U_{21}$, and the sum of the two best CQIs, CQI_SB1 and CQI_SB5 for $U_{22}$ are compared with one another. If the sum of CQI_SB5 and CQI_SB2 for $U_{11}$ is the highest, the MS selects CQI_SB5 and CQI_SB2 for $U_{11}$ as feedback information. Then, the MS eliminates the selected CQI_SB5 and CQI_SB2 from the channel quality lists of $U_{11}$, $U_{12}$, $U_{21}$ and $U_{22}$, as indicated by dotted rectangles.

The sum of the next two best CQIs in the channel quality list of $U_{11}$, CQI_SB6 and CQI_SB1, the sum of the two best CQIs, CQI_SB3 and CQI_SB4 for $U_{12}$, the sum of the two best CQIs, CQI_SB9 and CQI_SB7 for $U_{21}$, and the sum of the two best CQIs, CQI_SB1 and CQI_SB4 for $U_{22}$ are compared with one another. If the sum of CQI_SB9 and CQI_SB7 for $U_{21}$ is the highest, the MS selects CQI_SB9 and CQI_SB7 for $U_{21}$ as feedback information.

As four subbands (M=4) that can be included in feedback information are all selected, the CQIs of two subband groups (L=M/G=2), [SB5, SB2] and [SB9, SB7] and the precoding vectors corresponding to the two subband groups are set in the feedback information, as illustrated in Table 4 below.

TABLE 4

| Precoding information | Channel quality information |
|---|---|
| $U_{11}$ | CQI_SB5, CQI_SB2 |
| $U_{21}$ | CQI_SB9, CQI_SB7 |

As is apparent from the above description, since each MS selects the CQIs of subbands and associated precoding matrices/vectors jointly, time and space resources can be appropriately selected without decreasing frequency and space diversity efficiency. Also, since a few subbands with highest CQIs are selected according to a subband grouping size for each preceding matrix/vector, the Signal-to-Interference and Noise Ratios (SINRs) of signals on the subbands are flat and a sufficient diversity gain is achieved. Therefore, feedback overhead is reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of transmitting feedback information representing channel quality in a receiver in a Multiple Input Multiple Output-Orthogonal Frequency Division Multiplexing (MIMO-OFDM) system, the method comprising:
    measuring channel qualities of signals transmitted on a plurality of subbands through a plurality of transmitter antennas by a transmitter;
    selecting a predetermined number of subbands having highest transmission performance based on the measured channel qualities and preceding information;
    selecting at least one subband group having a maximum sum rate from among the selected subbands having the highest transmission performance based on preceding information associated with the at least one subband group; and
    transmitting feedback information to the transmitter, the feedback information including channel quality information about the at least one subband group and the associated preceding information.

2. The method of claim 1, wherein the measuring of the channel qualities comprises measuring Channel Quality Indications (CQIs) of the respective signals of the plurality of subbands.

3. The method of claim 2, wherein the selecting of the predetermined number of subbands comprises selecting the subbands based on the preceding information in a CQI descending order.

4. The method of claim 1, wherein the preceding information represents a preceding matrix to be multiplied by a transmission signal during preceding in the transmitter.

5. The method of claim 1, wherein the preceding information represents a column vector of a preceding matrix to be multiplied by a transmission signal during preceding in the transmitter.

6. The method of claim 1, wherein the at least one subband group has the maximum sum rate with respect to the associated precoding information.

7. The method of claim 1, wherein the determining of the at least one subband group and the preceding information is repeated until the number of selected subband groups is equal to a predetermined number and a number of selected subband groups is calculated by dividing a number of subbands with the best transmission performance selected for each piece of preceding information by the number of subbands per subband group.

8. The method of claim 1, further comprising limiting a size of the subband group, if the number of subbands in the subband group is the same as the subband group.

9. An apparatus transmitting feedback information representing channel quality in a receiver in a Multiple Input Multiple Output-Orthogonal Frequency Division Multiplexing (MIMO-OFDM) system, the apparatus comprising:
 a channel quality measurer measuring channel qualities of signals transmitted on a plurality of subbands through a plurality of transmitter antennas by a transmitter; and
 a feedback information generator selecting a predetermined number of subbands with a highest transmission performance based on the channel quality measurements and on precoding information, determining at least one subband group with a maximum rate from among the selected subbands and precoding information associated with the at least one subband group, and transmitting feedback information to the transmitter, the feedback information including channel quality information about the at least one subband group and the associated preceding information.

10. The apparatus of claim 9, wherein the channel quality measurer measures Channel Quality Indications (CQIs) of respective signals of the plurality of subbands.

11. The apparatus of claim 10, wherein the feedback information generator selects the subbands based on preceding information in a CQI descending order.

12. The apparatus of claim 9, wherein the preceding information represents a precoding matrix to be multiplied by a transmission signal during precoding in the transmitter.

13. The apparatus of claim 9, wherein the preceding information represents a column vector of a preceding matrix to be multiplied by a transmission signal during precoding in the transmitter.

14. The apparatus of claim 9, wherein the at least one subband group has a maximum sum rate with respect to the associated preceding information.

15. The apparatus of claim 9, wherein the feedback information generator repeats the determination as to the at least one subband group and the associated preceding information until a number of selected subband groups is equal to a predetermined number, and the number of selected subband groups is calculated by dividing a number of subbands with the highest transmission performance selected for each piece of preceding information by the number of subbands per subband group.

16. The apparatus of claim 9, wherein if the number of subbands in the subband group is the same as the subband group, the size of the subband group is limited, according to an amount of feedback information.

17. A method of receiving feedback information representing channel quality from at least one receiver in a transmitter in a Multiple Input Multiple Output-Orthogonal Frequency Division Multiplexing (MIMO-OFDM) system, the method comprising:
 receiving feedback information from the at least one receiver, the feedback information including channel quality information about at least one subband group and an associated preceding information; and
 determining a transmission parameter for subband allocation and precoding according to the feedback information in order to transmit a transmission signal,
 wherein the at least one subband group is selected from among a predetermined number of subbands having a highest transmission performance based on channel qualities measured in the at least one receiver and based on precoding information.

18. The method of claim 17, wherein the channel quality information includes Channel Quality Indications (CQIs) of a plurality of subbands on which the transmission signal is transmitted.

19. The method of claim 18, wherein the predetermined number of subbands are selected from among total subbands in a CQI descending order based on the preceding information.

20. The method of claim 17, wherein the precoding information represents a preceding matrix to be multiplied by the transmission signal during preceding in the transmitter.

21. The method of claim 17, wherein the preceding information represents a column vector of a precoding matrix to be multiplied by the transmission signal during preceding in the transmitter.

22. The method of claim 17, wherein the at least one subband group has a maximum sum rate with respect to the associated precoding information.

23. The method of claim 17, wherein if the number of subbands in the subband group is the same as the subband group, the size of the subband group is limited, according to an amount of feedback information.

24. An apparatus receiving feedback information representing channel quality from at least one receiver in a transmitter in a Multiple Input Multiple Output-Orthogonal Frequency Division Multiplexing (MIMO-OFDM) system, the apparatus comprising:
 a feedback information receiver receiving feedback information from the at least one receiver, the feedback information including channel quality information about at least one subband group and an associated precoding information; and
 a scheduler determining a transmission parameter for subband allocation and precoding according to the feedback information in order to transmit a transmission signal,
 wherein the at least one subband group is selected from among a predetermined number of subbands having a highest transmission performance based on channel qualities measured in the at least one receiver and based on precoding information.

25. The apparatus of claim 24, wherein the channel quality information includes Channel Quality Indications (CQIs) of a plurality of subbands on which the transmission signal is transmitted.

26. The apparatus of claim 25, wherein the predetermined number of subbands are selected from among total subbands in a CQI descending order based on the preceding information.

27. The apparatus of claim 24, wherein the preceding information represents a preceding matrix to be multiplied by the transmission signal during precoding in the transmitter.

28. The apparatus of claim 24, wherein the preceding information represents a column vector of a precoding matrix to be multiplied by the transmission signal during preceding in the transmitter.

29. The apparatus of claim 24, wherein the at least one subband group has a maximum sum rate with respect to the associated preceding information.

30. The apparatus of claim 24, wherein if the number of subbands in the subband group is the same as the subband group, the size of the subband group is limited, according to an amount of feedback information.

31. An apparatus transmitting feedback information comprising:
  a subband channel quality measurer detecting a pilot signal and measuring channel quality information of subbands of the pilot signal; and
  a feedback information generator collecting the channel quality information of each of the subbands forming part of preceding matrices, creating a channel quality list, each list having the channel quality information of the subbands, in a descending order for each of the preceding matrices, and generating feedback information including the channel quality information of a predetermined number of the subbands having highest transmission efficiency, and an associated preceding matrix and transmitting the feedback information to a transmitter.

32. The apparatus of claim 31, wherein the transmitter selects the associated preceding matrix according to the feedback information and determines transmission parameters based on the channel quality information.

33. The apparatus of claim 32, wherein the transmitter selects the associated preceding matrix which maximizes a sum rate based on the feedback information.

* * * * *